United States Patent
Revette

(10) Patent No.: US 6,588,720 B1
(45) Date of Patent: Jul. 8, 2003

(54) WATER COOLER HOLDER

(76) Inventor: Patrick Revette, 90 Raymond Revette Rd., Stateline, MS (US) 39362

( * ) Notice: Subject to any disclaimer, the term of this patent is extended or adjusted under 35 U.S.C. 154(b) by 0 days.

(21) Appl. No.: 10/108,816

(22) Filed: Mar. 28, 2002

(51) Int. Cl.[7] ............................................... A47K 1/08
(52) U.S. Cl. ................ 248/311.2; 211/70.6; 211/85.18; 224/403; 248/310
(58) Field of Search ............................. 248/311.2, 312, 248/346.06, 313, 309.1, 284.1, 310, 291.1; 211/85.18, 74, 70.6; 414/408; 224/403, 282, 349; 296/165

(56) References Cited

U.S. PATENT DOCUMENTS

| | | | | |
|---|---|---|---|---|
| 1,779,060 A | * | 10/1930 | Choate | 220/6 |
| 2,939,585 A | * | 6/1960 | Burgin | 211/32 |
| 4,131,259 A | * | 12/1978 | Franks | 248/311.2 |
| 4,535,923 A | * | 8/1985 | Manke | 224/550 |
| 4,860,986 A | * | 8/1989 | Couzens | 248/313 |
| 5,018,929 A | * | 5/1991 | Carson | 414/408 |
| 5,255,951 A | * | 10/1993 | Moore, III | 296/3 |
| 5,797,715 A | * | 8/1998 | Christenson | 414/408 |
| 5,799,849 A | * | 9/1998 | Beer et al. | 224/403 |
| 5,964,358 A | * | 10/1999 | Hafendorfer et al. | 211/70.6 |
| 6,227,509 B1 | * | 5/2001 | Plocher et al. | 248/311.2 |
| 6,350,098 B1 | * | 2/2002 | Christenson et al. | 414/408 |

* cited by examiner

Primary Examiner—Ramon O. Ramirez
Assistant Examiner—Tan Le
(74) Attorney, Agent, or Firm—George L. Williamson

(57) ABSTRACT

The present invention discloses a holder for a portable water cooler, which holder is designed to be mounted onto the inside of the side of a bed of a pickup truck. The water cooler holder has a cylindrical container-like member which securely holds the water cooler therein which member is mounted onto a frame which pivots from a first downward position to a second upward position so that the water cooler can be accessed from the outside of the bed of the pickup.

12 Claims, 2 Drawing Sheets

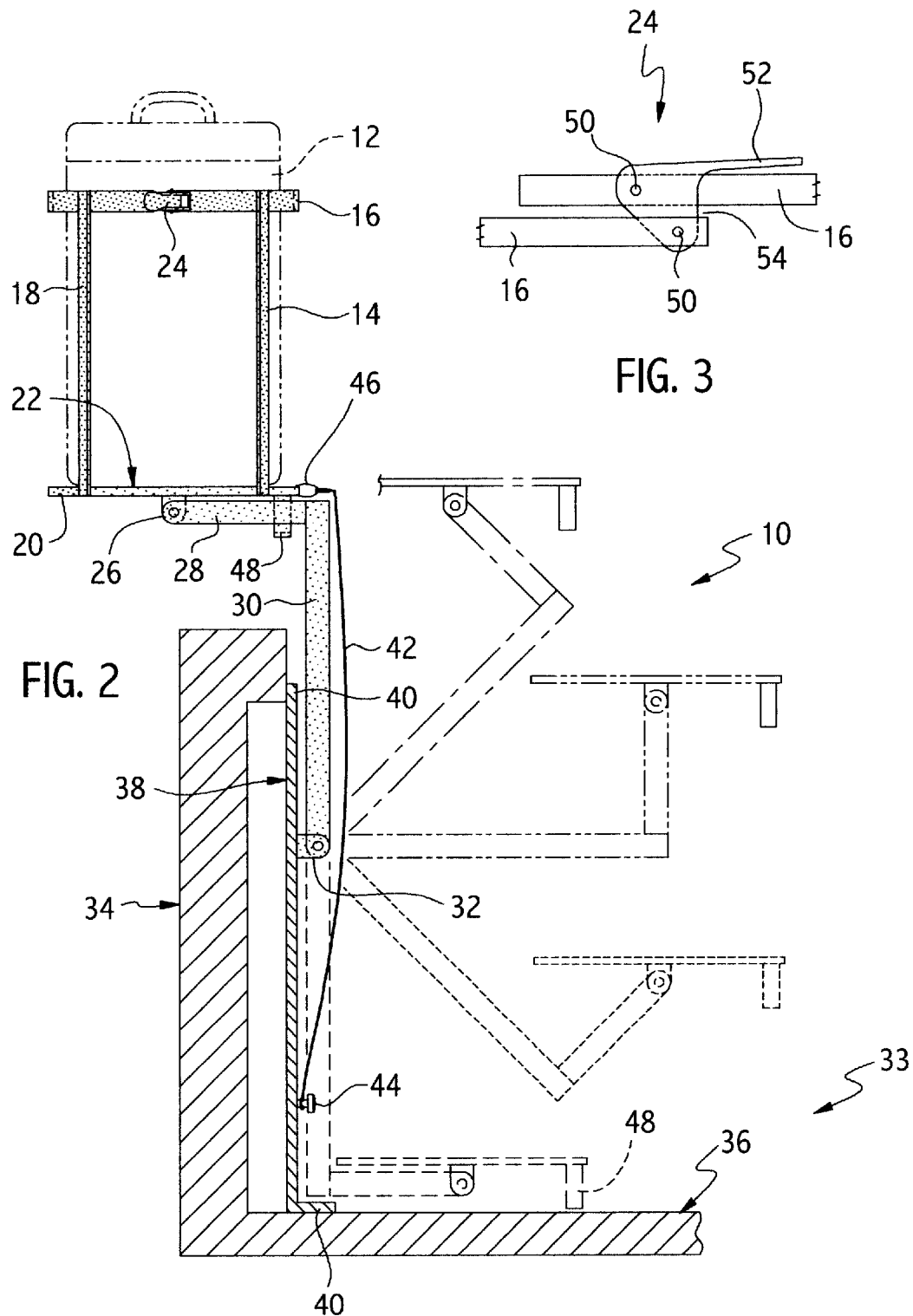

WATER COOLER HOLDER

BACKGROUND OF THE INVENTION

1. Field of the Invention

The present invention relates generally to water coolers, and, more particularly, is concerned with a holder for a water cooler for being mounted onto a vehicle.

2. Description of the Prior Art

Water coolers have been described in the prior art; however, none of the prior art devices disclose the unique features of the present.

In U.S. Pat. No. 5,799,849, dated Sep. 1, 1998, Beer, et al., disclosed a safety carrier for stabilizing a pressure-fluid bottle in an upright position in a pickup box in a truck which has a carrier frame operatively anchored to the truck's frame and a rigid ring connected to the frame in an articulated manner. The ring is on a swivel mount at an end of a pivoting arm. The arm is attached to the frame. The ring may be selectively changed by a user, without disconnecting from the frame, between an operative configuration and a stowage configuration. In the operative configuration, the ring is generally horizontal and projects out over the pickup box's floor to receive and fit closely about the pressure fluid bottle. An adjustable strap attached at one end to the ring includes a hook at an opposite end for securing a flange on the bottle. In the stowage configuration, the ring is rotated to a generally vertical position and the arm is pivoted to swing the ring flush against a wall of the pickup box. The carrier frame is anchored to a lip on the pickup box. The carrier frame is anchored to a lip on the pickup box wall by a clamping portion. The carrier frame is adjustable in height to accommodate differently sized trucks. The ring may be coupled to the carrier frame at an adjustable relative height to accommodate differently sized bottles. The arm is captured in place in a tube welded to the frame by a safety pin inserted through a safety pin aperture defined radially through the arm.

In U.S. Pat. No. 840,130, dated Jan. 1, 1907, Hylton disclosed an invention relating to certain new and useful improvements in collapsible stands for water-coolers, the object being to provide a cheap, simple, and substantial stand which may be readily assembled for use or taken apart for shipping purposes.

In U.S. Pat. No. 861,093, dated Jul. 23, 1907, Cordley disclosed an invention relating to a collapsible stand for supporting water coolers and accessories thereof, and consisting of a stand which may be folded up so as to occupy the least possible space when boxed or crafted for shipment; which stand may, however, be readily unfolded and set up for use; and when properly adjusted the various elements thereof will be locked in position thereby forming a strong and rigid stand especially adapted for the purpose specified.

While these devices may be suitable for the purposes for which they were designed, they would not be as suitable for the purposes of the present invention, as hereinafter described.

SUMMARY OF THE PRESENT INVENTION

The present invention discloses a holder for a portable water cooler, which holder is designed to be mounted onto the inside of the side of a bed of a pickup truck. The water cooler holder has a cylindrical container-like member which holds the water cooler therein which member is mounted onto a frame which pivots from a first downward position to a second upward position so that the water cooler can be accessed from the outside of the bed of the pickup.

An object of the present invention is to provide a holder for a water cooler. Another object of the present invention is to securely contain a water cooler to prevent the water cooler from moving around in the back end of a pickup truck while the truck is in motion. Another object of the present invention is to provide a water cooler holder which can be easily moved from the inside of a pickup truck to the outside of a pickup truck.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 2 is a side elevation view of the present invention shown in operative connection.

FIG. 3 is a side elevation view of a portion of the present invention.

LIST OF REFERENCE NUMERALS

Figure 1:
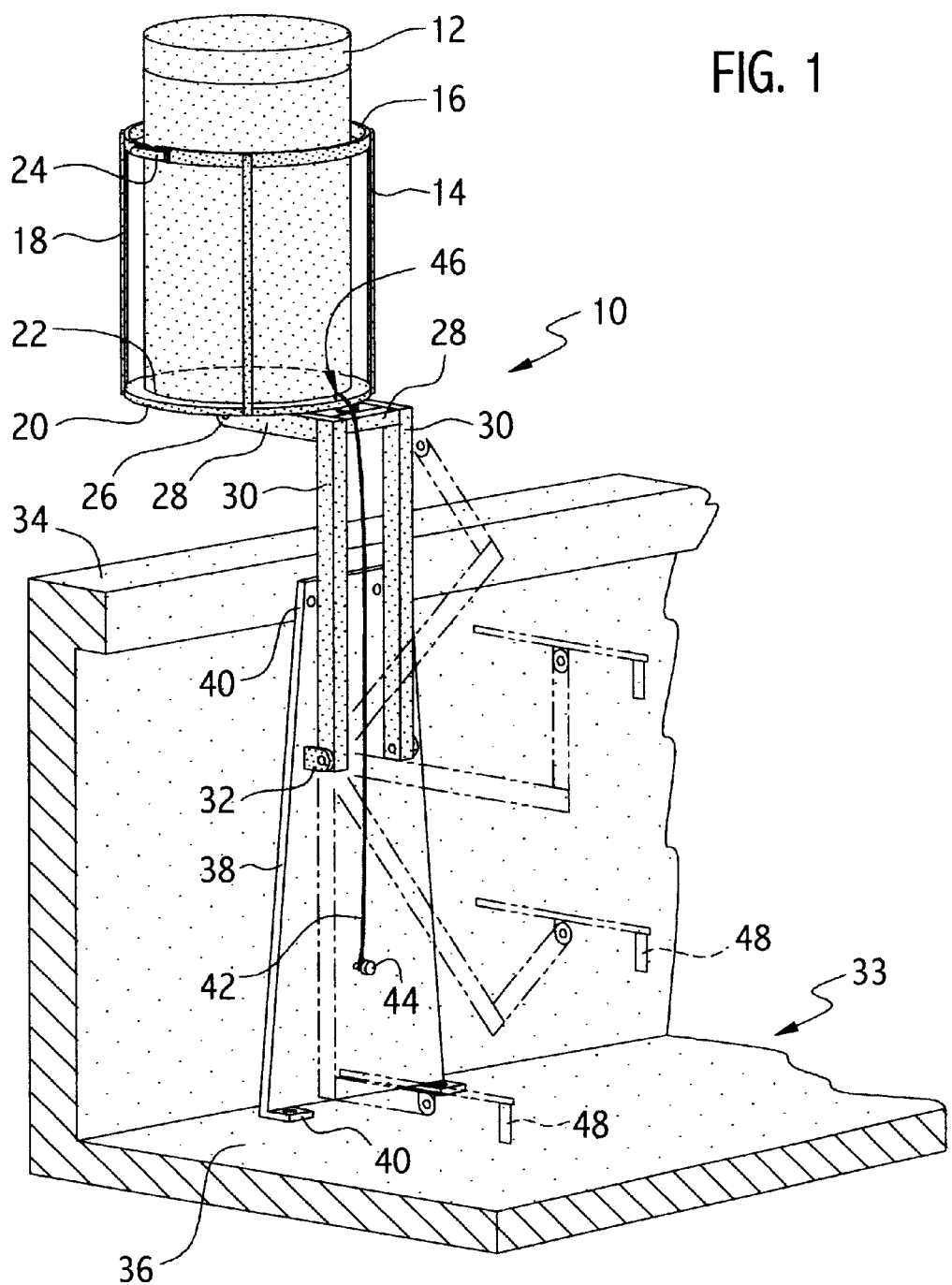
FIG. 1 is a perspective view of the present invention shown in operative connection.

With regard to reference numerals used, the following numbering is used throughout the drawings.

| | |
|---|---|
| 10 | present invention |
| 12 | water cooler |
| 14 | canister |
| 16 | strap member |
| 38 | side frame member |
| 20 | bottom of canister |
| 22 | bottom of water cooler |
| 24 | fastener |
| 26 | pivot |
| 28 | frame member |
| 30 | frame arm |
| 32 | pivot |
| 33 | bed of pickup |
| 34 | side of bed |
| 36 | bottom of bed |
| 38 | base |
| 40 | fastener |
| 42 | cable |
| 44 | connection |
| 46 | connection |
| 48 | leg |
| 50 | pivot |
| 52 | arm |
| 54 | base |

DETAILED DESCRIPTION OF THE PREFERRED EMBODIMENT

In order that the invention may be more fully understood, it will now be described, by way of example, with reference to the accompanying drawings in which FIGS. 1 through 3 illustrate the present invention wherein a water cooler holder for use with a vehicle is disclosed.

Turning to FIGS. 1–2, shown therein is the present invention 10 along with a conventional water cooler 12 which water cooler is disposed in an upwardly standing cylindrical frame-like member or canister 14 which is cup-like in order to receive the water cooler 12 therein. The water cooler 12 has a top thereon and means such as a spigot (not shown) on its side to release water therefrom. Canister 14 has an upper strap-like member 16 disposed about the water cooler in the horizontal plane along with a plurality of upright standing side frame support members 18 which connect the upper strap-like member 16 to a lower base or plate 20 of the canister 14 which base communicates with and receives the bottom 22 of the cooler 12. The upper strap 16 also has a fastener 24 which is a quick release buckle-type or like fastening member which is used to removably connect the ends of the strap-like member 16 around the water cooler 12 in order to secure the water cooler internal canister 14 to prevent the water cooler from being tossed about the bed 33 of the pickup as the pickup or like vehicle is being driven. The underside of the base 20 of canister 14 is connected pivotally at 26 to a pair of parallel frame members 28 which are securely perpendicularly connected to another pair of parallel frames or arms 30 which pivot at 32 so as to allow the arms 30 and frame members 28 to pivot from a first lower position inside the bed 33 of a pickup to a second upper position so that the canister 14 having the water cooler 12 therein can be accessed from the outside of the side 34 of the pickup truck bed 33. The present invention is mounted pivotally at 32 onto a vertically disposed base frame 38 which is connected by a plurality of fastening means 40 to the inside of the side 34 and/or bottom 36 of bed 33 of the pickup truck. Also shown is a cable member 42 which has one end connected at 44 to the base 38 and a second end connected at 46 to inside of the base 20 of the canister in order to prevent the canister 14 from tipping over to the outside of the bed 33 of the pickup truck. It can also be seen that the underside of base 20 of the canister 14 has a downwardly extending leg 48 thereon which supports the bottom of the canister in its lower position by having the leg 48 rest on the bottom 36 of the bed 33 of the pickup truck.

Turning to FIG. 3, shown therein is a view of another type of fastener 24 along with the two ends of strap 16. Fastener 24 has a conventional offset or cantilevered base 54 which is connected pivotally at 50 to the ends of the strap 16 and has an arm 52 thereon for locking the two strap ends together so as to tighten strap 16 about a water cooler as previously disclosed.

I claim:

1. An apparatus for holding a conventional water cooler onto the inside of the side of the bed of a vehicle in combination, comprising:

a) a first base disposed on the inside of the side of a vehicle, wherein said first base has a first upper end and a second lower end;

b) a cylindrical member for containing the water cooler, said cylindrical member having a first upper end and a second bottom end; and, c) a first frame member pivotally connecting said cylindrical member to said first base, wherein said cylindrical member moves from a first lower position internal the bed of a vehicle to a second upper position external the bed of a vehicle to permit a user to obtain water from the water cooler.

2. The apparatus of claim 1, wherein said first base further comprises fasteners for connection of said first upper end to the inside of the side of a vehicle and said second lower end to the bed of a vehicle to permit the first base to be substantially vertically disposed.

3. The apparatus of claim 2, wherein said first base is substantially vertically disposed on the inside of the side of the bed of a vehicle.

4. The apparatus of claim 3, wherein said cylindrical member further comprises a strap disposed on said first upper end of said cylindrical member, a base member disposed on said second lower end of said cylindrical member, said base member having a top side and an underside, and a plurality of second frame members disposed between said strap and said base member so that a canister-like member is formed to receive the water cooler therein.

5. The apparatus of claim 4, wherein said strap further comprises a fastener for removably connecting the ends of said strap to each other to permit the strap to be secured about the water cooler.

6. The apparatus of claim 5, wherein said first frame member further comprises a third frame member pivotally connected to said underside of said base member, said third frame member having a first end and a second end, said first end being pivotally connected to said underside of said base member and said second end being perpendicularly securely connected-to a fourth frame member.

7. The apparatus of claim 6, wherein said fourth frame member has a first end and a second end, said first end of said fourth frame member being securely perpendicularly connected to said second end of said third frame member, and said second end of said fourth frame member being pivotally connected to said first base to permit said cylindrical member to move from a first lower position internal the bed of a vehicle to a second upper position eternal the bed of a vehicle.

8. The apparatus of claim 7, wherein each of said third and said fourth frame members further comprises a pair of parallel frame members.

9. The apparatus of claim 8, further comprising a downwardly extending leg disposed on said underside of said base member of said cylindrical member to contact the bed of the vehicle to provide support to the base member.

10. The apparatus of claim 9, further comprising a cable connecting said base member of said cylindrical member to said first base to prevent the water cooler from tilting over to the outside of the bed of a vehicle.

11. The apparatus of claim 10, wherein said fastener for removably connecting the ends of said first strap further comprises a buckle-type fastener.

12. The apparatus of claim 11, wherein said fastener for removably connecting the ends of said first strap further comprises an offset-type fastener.

* * * * *